March 18, 1947.   F. H. KELLEY ET AL   2,417,691
AIRCRAFT FLIGHT CONTROL
Filed June 3, 1943   7 Sheets-Sheet 1

FIG. 1.

ROBERT M. STANLEY
AND FRANK H. KELLEY
INVENTORS.

BY
THEIR PATENT ATTORNEY.

Patented Mar. 18, 1947

2,417,691

UNITED STATES PATENT OFFICE 2,417,691

AIRCRAFT FLIGHT CONTROL

Frank H. Kelley, Rosemond, Calif., and Robert M. Stanley, Kenmore, N. Y., assignors to United Aircraft Corporation, East Hartford, Conn., a corporation of Delaware Application June 3, 1943, Serial No. 489,428

12 Claims. (Cl. 244—42)

This invention relates to aircraft controls and more particularly to a master control for the automatic operation of a plurality of aircraft instrumentalities for a given flight or taxiing condition of the airplane.

One of the objects of the present invention is to provide a single master control, movement of which prepares the airplane for a given condition such as for landing, flight, taxiing and take-off. It is a further object of the present invention to relieve the pilot of those extra burdens during certain periods of flight which normally require that he operate a plurality of aircraft components or instrumentalities, such as extension or retraction of the landing gear, locking of the tail wheel, extension or retraction of the flaps, the extension of the arresting hook, or the control of the power plant and its accessories such as the propeller speed, throttle setting, supercharger speed or their controls, and others.

The setting or control of each of the above components of the aircraft are but a few of the many instrumentalities which require the pilot's attention and during the critical landing period in the operation of the airplane, his major attention is directed to the control of the airplane by means of the control stick and the rudder pedals, the observance of numerous instruments on his instrument panel and close attention to the surface upon which he is about to land. In the case of ship-based aircraft, particularly of the high performance military type, the multiplicity of duties of the pilot during the critical few seconds which elapse during the landing operation are also particularly exacting.

These operations have been simplified by the present invention to a maximum degree such that a large number of component parts and accessories of the airplane are prepared or conditioned for a plurality of operations merely by the positioning of a master control lever. It is accordingly one of the primary objects of the present invention to provide a master flight control which coordinates most of the operations necessary in preparing the airplane for taxiing (and take-off) flight, and landing and to provide a high performance airplane in which the pilot is relieved of having to set each control separately. It is also an object of the present invention to permit superimposing of manual operations upon these functions at any position of the master control.

Other objects and advantages of the present invention will become apparent to those skilled in the art upon reading the following specification and the accompanying drawings forming a part hereof.

Figure 1:
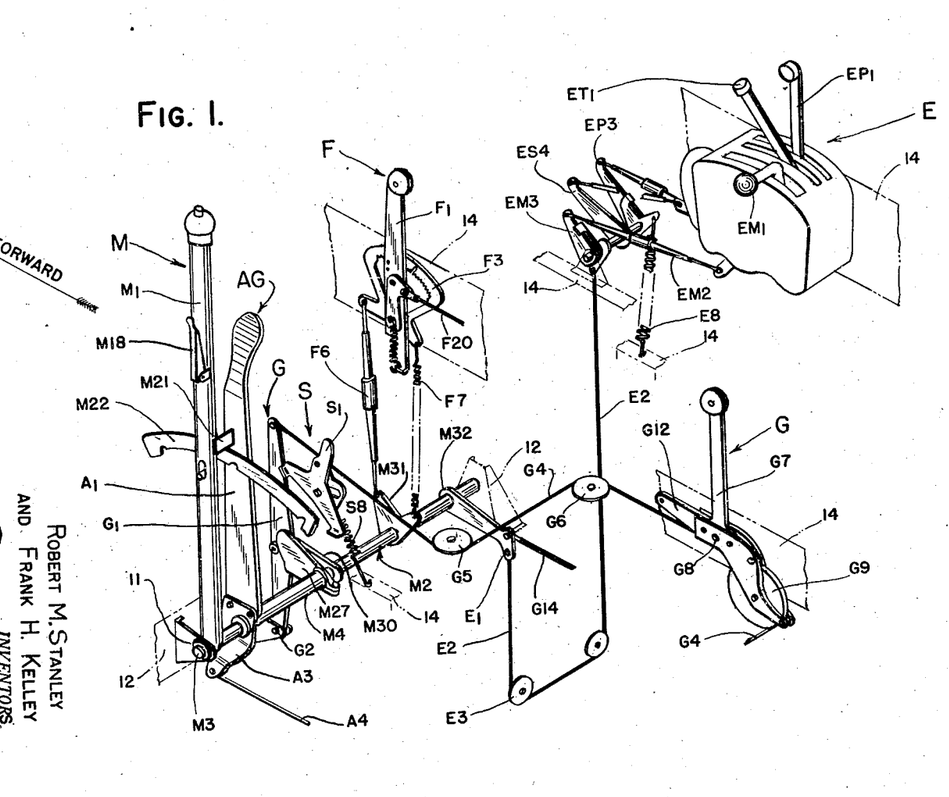
Fig. 1 is an isometric view of the master control system and its interconnection with the manual controls for the landing and arresting gears, the flap operation system and the power plant controls.

Referring now to Fig. 1, there is shown an isometric view of the master control and the several interconnected manual controls as would be located in the cockpit of an airplane and as viewed looking somewhat to the right of the forward direction. In this figure the master control is indicated by the letter M, the arresting gear control by AG, the tail wheel lock and landing gear control by G, the control for the landing flaps by F, and the power plant, or engine control by E. A safety lever control for engagement with the master control M is indicated by the letter S. For the relationship of these controls and the several instrumentalities to which they are connected, reference should be made to Fig. 11.

In the particular form of the present invention which has been shown and described for illustrative purposes only, the master control has been provided for three main conditions of aircraft flight, or movement. These conditions are the landing, taxiing and flight conditions respectively. As indicated in the side elevational view of the master control lever MI in Fig. 2 the forward position of the lever is indicated "land," or the position for landing, the intermediate position slightly rearward of the vertical position is indicated as "taxi" or the taxiing and "take-off" condition and the full rearward position as the "flight" or flying position. It is pointed out here, however, that the present invention is not limited specifically to these three positions of airplane flight or movement, nor to this particular order or sequence of these conditions.

The relative dispositon of the "land," "taxi" and "flight" settings of the master control lever MI closely parallel or simulate the positions of the joystick or control stick of the airplane for the same operating conditions. In other words, in the central or neutral position of both the joystick and the master control lever, the airplane is normally in a taxiing or take-off condition; when both the joystick and the master control are moved rearwardly during take-off the airplane is conditioned for climb or flight; and similarly, when the joystick and the master control are moved into their extreme forward position the airplane is nosed down or conditioned for a landing as a result of the joystick movement actuating the elevator means or dive control, and the various components of the airplane such as the landing gear, wing flaps, arresting gear or tail wheel lock, and engine control instrumentalities are conditioned for the landing operation by the master control unit.

Figure 11:
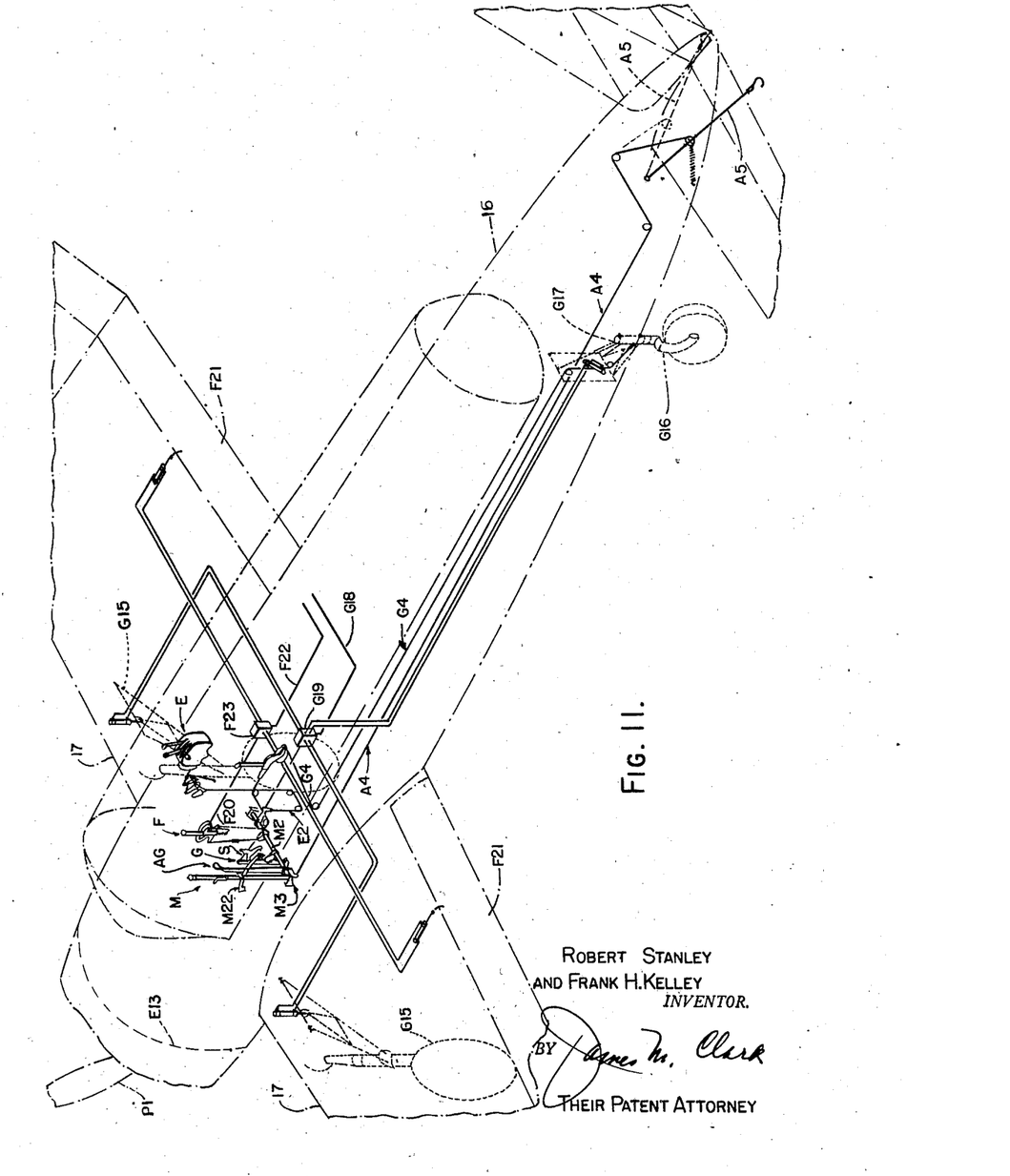
Fig. 11 is an isometric phantom view of a major portion of an airplane showing the master control system, the manual controls and the several instrumentalities with which they are associated.

Referring to Fig. 11, there is shown an airplane embodying the present invention, this airplane having a fuselage 16 and wings 17 attached thereto; and having associated with its wings, the main leanding gear units G15; and with its fuselage, the tail wheel G16, tail wheel lock G17 and the arresting hook A5. In addition to the conventional flight control surfaces, which have been indicated fragmentarily in this figure, the airplane is provided with an engine or power plant E13 driving a conventional propeller P1, and the wings are provided at their trailing edges with flaps or similar devices F21. These flaps and the landing gear units are preferably operated hydraulically by fluid under pressure from a suitable source and supplied through the conduits F22 and G18, respectively, in communication with the control valves F23 and G19, respectively.

It should also be noted that the "land," "taxiing or take-off" and "flight" positions of the master control lever MI are predicated upon the selection of these positions by the pilot prior to his operation of the joystick to condition the control surfaces or other aerodynamic instrumentalities of the airplane. For example, in the take-off operation the master lever MI would necessarily be positioned in its central or "taxi" position before the joystick of the airplane is manipulated rearwardly such that the aircraft is permitted to take off. Similarly, while the airplane is in flight and it is desired to make a landing, the master lever is moved forward into the "land" position prior to the actual control of the movement of the airplane and its contact with the ground, or flight deck of a carrier.

Referring again to the isometric view in Fig. 1 it will be noted that the master control lever MI is mounted for fore and aft rocking together with its crank or torque tube assembly M2 and the tubular shaft M3 within suitable bearing brackets 11 carried upon the aircraft structural framework 12. The master control handle or lever MI is of tubular construction being welded or otherwise fixedly attached to the tubular shaft M3. The crank assembly M2 comprises a number of crank and cam elements fixedly attached thereto and having a tubular hub portion which fits closely over the front torque shaft M3 to which it is fixedly attached by means of the through bolts M5. Additional cam and lever elements, to be hereinafter more fully described, are attached to the hub element M4, more clearly shown in Figs. 3 and 4. The hub element M4 is provided with an internal bore to permit rotation upon the outside of the torque shaft M3 and its outer surface is suitably splined to receive cam elements to be later described.

The master control lever MI is provided at its upper terminal with a part-spherical knob portion M6 having a cylindrically bored hub which fits over the upper end of the tube MI and to which it is fixedly attached by a plurality of rivets M6a. The upper portion of the knob M6 is provided with a co-axial, and smaller diameter bore to accommodate the button M7 which is fixedly attached as by the rivet M7a to the rod M8 which extends down through the center of the hollow tubular lever MI.

The rod M8 has fixedly attached thereto a cross-bar M9 and circular flanges M10, M11 and M12 having outside diameters which permit them to reciprocate freely in an axial direction with respect to the hollow tube MI. The cross-bar M9 is of a greater length than the outside diameter of the tube MI which has provided in its walls opposed openings M13 and M14 through which the cross bar is adapted to project and to be guided in its axial movements within the tubular lever. A compression coil spring M16 is disposed between the inner lower recess in the button M7 and a washer M15 disposed within the upper end of the tube MI and retained therein by means of the rivets M6a, such that the spring M16 continually urges the button M7 and the attached rod M8 into its upper position.

Intermediate the knob M6 and the projecting cross-bar M9 there is provided an opening M14 in the wall of the lever MI adjacent to which are attached a pair of projecting lugs M17. An L-shaped trigger element M18 is pivoted to the bracket-forming lugs M17 by means of the pivot pin M19 and has cam or tongue portions projecting into the hollow tube MI, embracing the rod M8 and bearing against the rod flanges M10 and M11. The trigger M18 is so arranged that clockwise movement as viewed in Fig. 3 will cause the rod M8 to move downwardly; the counterclockwise return rotation of the trigger under influence of the spring M16, which is imparted to the trigger element whenever the rod M8 is free to move to its upper limits with respect to the tube MI, causes engagement of the bar M9 with the rack M22 or any of its notches with which it may become alined. The trigger element M18 serves as a secondary release lever and is provided midway down on the inboard side of the master flight control lever MI adjacent the hand grip portion of the arresting hook control lever A1 for use when it is desired to move both the master flight control and the arresting hook control in conjunction with each other. When the main lever MI is gripped together with the arresting gear lever AG for an "arrested" landing, the secondary release lever M18 is depressed rather than the button M7, for a more convenient grip. The function of both the button M7 and the trigger release M18 is identical, namely to release the rod M9 from the quadrant M22.

The master control lever M1 has welded or otherwise suitably attached thereto the projecting lugs M20 and M21. The lever is mounted such that it is rocked closely adjacent a sector or quadrant M22 provided with a forward notch M23, an intermediate notch M24 and a rearward notch M25 adapted to receive the inwardly extending portion of the cross-bar M9. The notch M23 determines the "land" position of the master control, the notch M24 determines the "taxi" position and the notch M25 determines its "flight" position. The sector or ratchet M22 is suitably attached as by the rivets M26 to the fuselage framework 14.

The aforementioned hub element M4 which is rotatably mounted upon the torque shaft M3 has welded or fixed thereto an offset lever portion A3 having the arresting gear lever A1 attached to its upper portion by means of the bolts A2. The lower offset portion of the lever A3 is suitably attached as by a clevis or other fitting to the cable A4 which extends aft in the airplane to its arresting hook or gear A5. The latter may be of any suitable type and, as is well understood by those skilled in the art, the cable A4 is connected to the arresting gear A5 in such manner that it may be extended into operative positions when the lever A1 is moved into a forward position, or which may be retracted into its inoperative position when the lever A1 is rotated or rocked rearwardly. The arresting hook lever A1 indexes in a notch in the edge of the shelf 14 along which its forward and rearward positions are indicated. The hub element M4 is provided with external splines M28 to which the cam element M27 is splined and clamped by means of the through bolt M29 as more clearly shown in Fig. 4. The cam element M27 is rocked only when the arresting gear lever A1 is rocked, and unlike its companion cam M30, it is not moved as the master lever M1 is rocked. The splines or serrations on the shaft M4 are to permit adjustment of cam M27, which is not required in the case of cam M30. The lower cam M30 is fixedly attached to the crank assembly M2 which in turn is fastened by the bolts M5 to the torque shaft M3. Both cams M20 and M30 are adapted to engage the rocking lever G1 pivoted to the aircraft structure 13 at its pivot G2 and directly engaging its roller elements G3.

As will be hereinafter more fully explained the lever G1 through its connected cable G4 running over the sheaves G5 and G6 determines the condition of the tail wheel lock G17, depending upon the setting of the manual tail wheel control lever G7.

Figures 5, 6, 10:
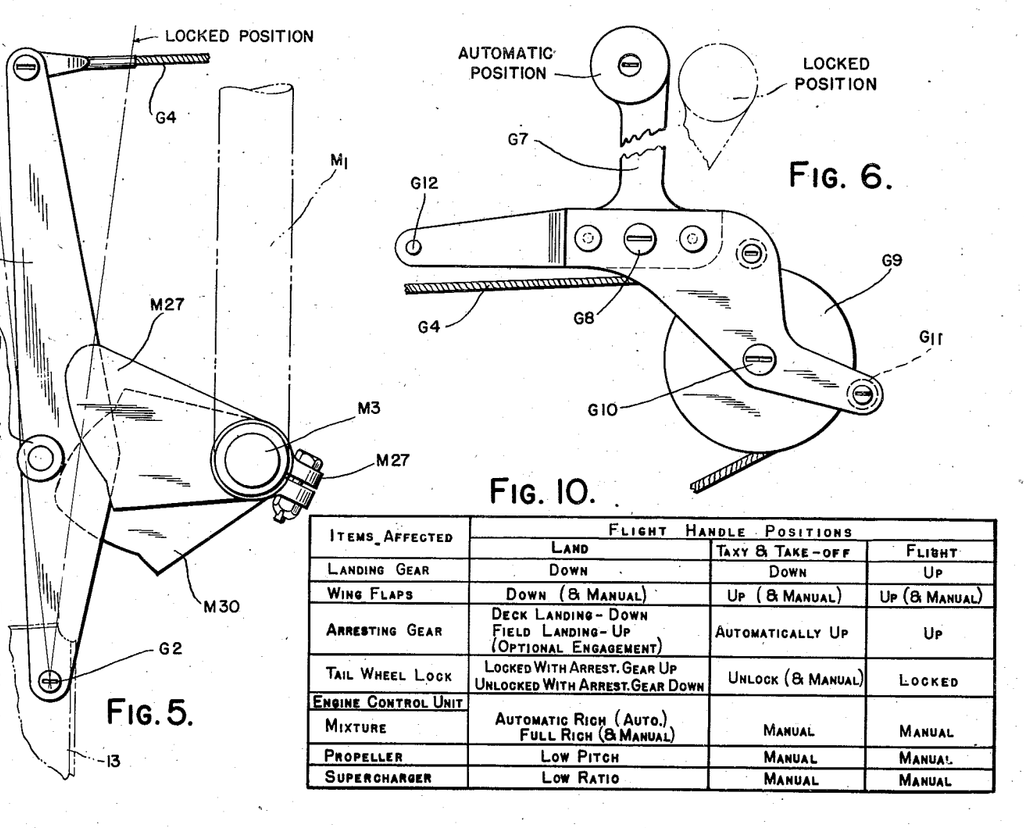
Fig. 5 is a view looking from the side in the same direction as Fig. 2 showing the mechanism for automatically locking the tail wheel.
Fig. 6 is a similar view, of the manually operated lever for the tail wheel lock.
Fig. 10 is a table showing the manner in which the various aircraft components and accessories are affected by the several positions into which the master flight handle may be operated.

As indicated in Fig. 5 the lever G1 is pivoted at G2 to the aircraft structure 13 and is provided at its upper free terminal with a connection to the tail wheel lock actuating cable G4. Intermediate the ends of the lever G1 pivoted rollers G3 are provided on each side, which are adapted to be engaged by the cam faces of the elements M27 and M30, contact with which determines the position into which the lever is rocked. The manual control lever for the tail wheel is shown in detail in Fig. 6, the forward or "automatic" position of the lever G7 permitting the tail wheel to be operated through the master control and the rearward or "locked" position permitting the tail wheel to remain locked. It is customary to have the tail wheel locked for field landings and unlocked for landing on the deck of a carrier.

The crank assembly M2 also includes an attached bellcrank lever M31, which is rocked in conformance with the master lever M1 and actuates the setting of the landing flaps through the manual landing flap control unit F1. Also included in the crank assembly M2 and rocked together with the control lever M1 is the lever M32 having a connection at E1 for the cable E2 extending to the engine or power plant control unit E, as well as a connection through the rod G14 to the hydraulic valve for the main landing gear control.

Figure 2:
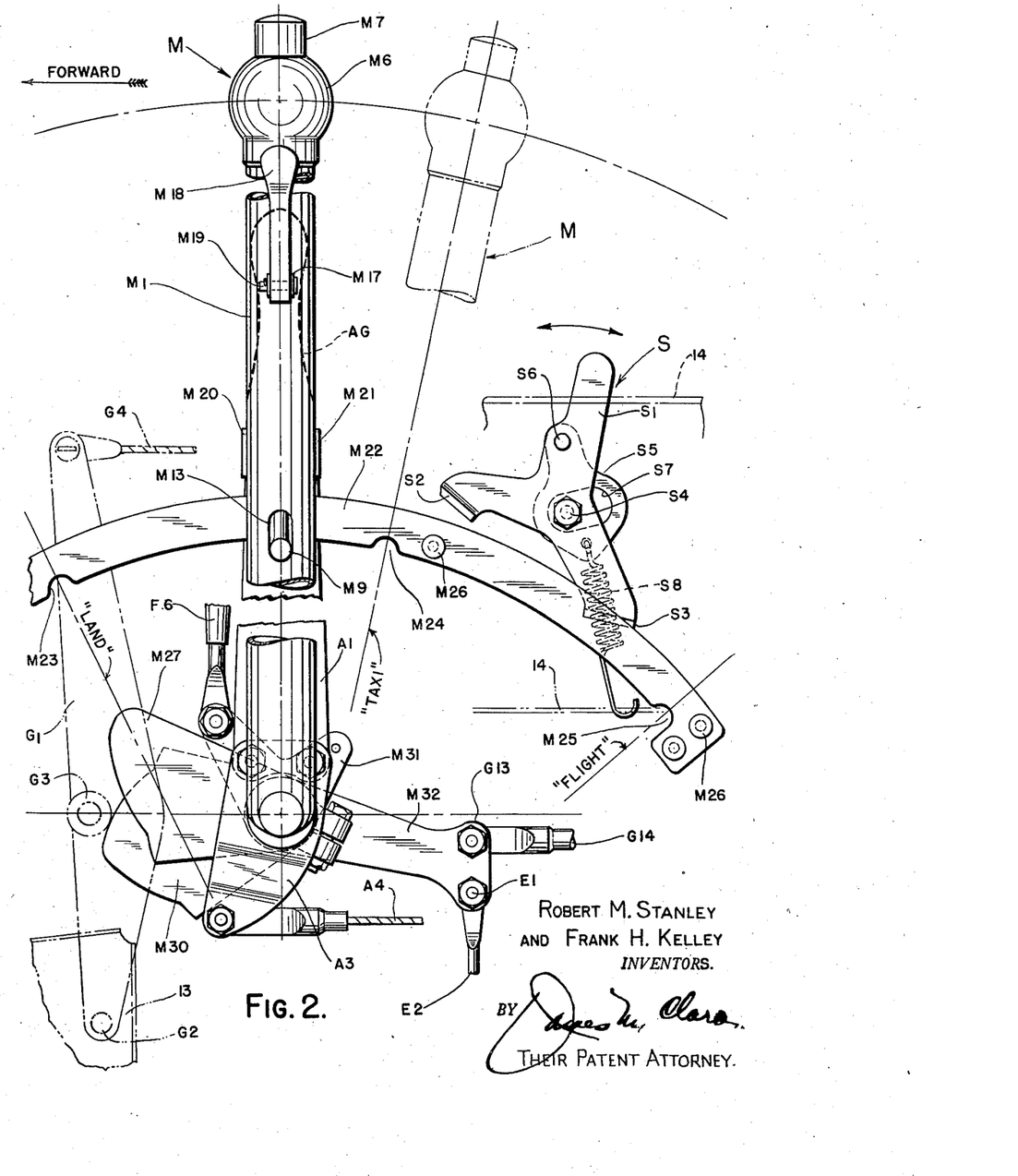
Fig. 2 is a detailed side view of the master control lever and the sector with which it is engageable.
Figures 3, 4:
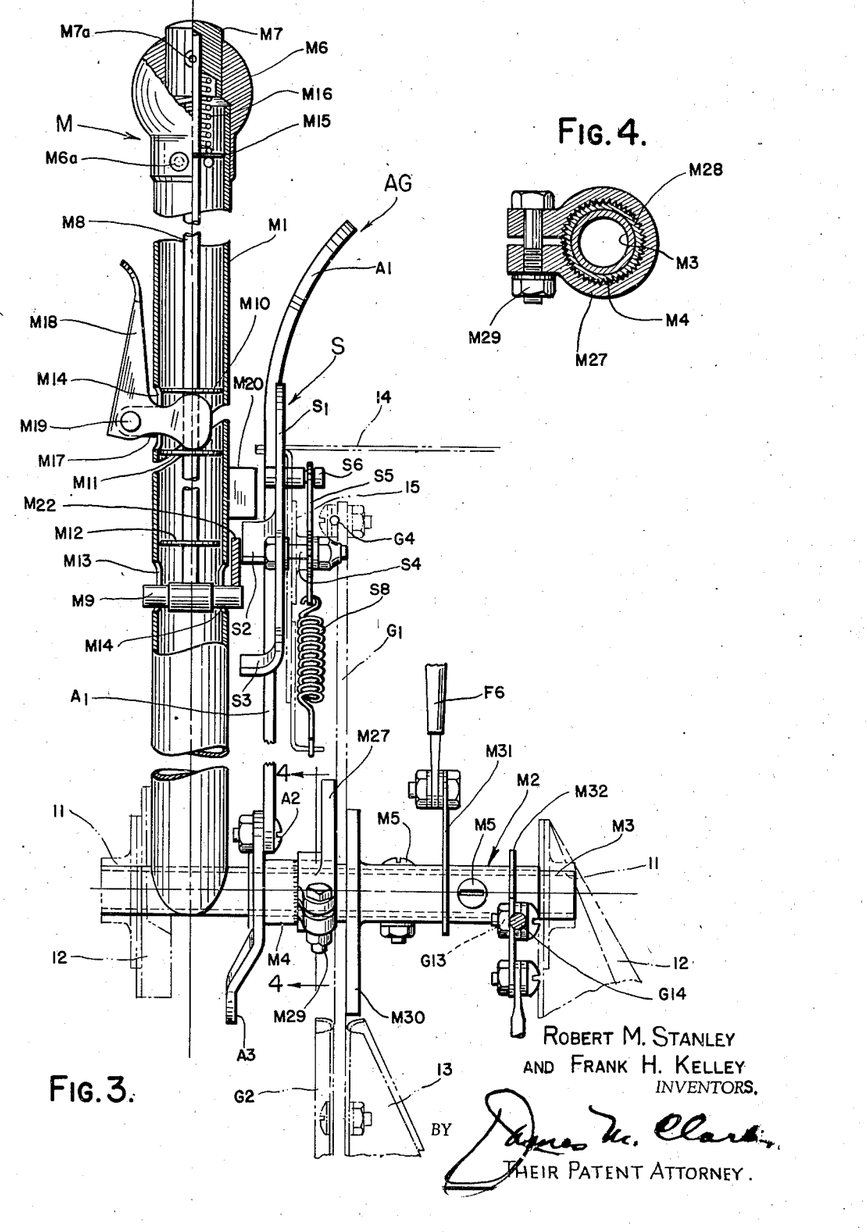
Fig. 3 is a part-sectional view of the same control shown in Fig 2, but looking forwardly.
Fig. 4 is a detail sectional view of the torque shaft taken along the line 4—4 in Fig. 3.

The safety control S indicated in Fig. 1, and shown in detail in Figs. 2 and 3, comprises essentially a plate element having three integral lever portions S1, S2 and S3 pivotally supported by its pivot S4 from the fuselage shelf structure 14 and the attached bearing brackets 15. The lever portion S1 extends above the shelf structure 14 and is adapted to be grasped manually by the hand of the operator for rotation about the fixed pivot S4. The three-prong lever S has a bent terminal portion S2 disposed at an angle and is adapted in the one position to serve as a stop against movement of the master control M1 and the lug M21 into the "flight" position, without its first being manually released by forward movement of the upper lever S1. The three-levered unit S has provided near its upper portion a pivot pin S6 from which is supported a heart-shaped plate S5 having a central aperture S7 to clear the pivot S4 and having its lower end attached to the tension spring S8 in turn anchored to a flange of the fuselage shelf structure 14. In Fig. 2 the safety control S is shown in its blocking position due to the spring S8 causing it to be rotated in a clockwise direction until the lever S1 bears against the rearward end of the slot in the shelf 14 and in which position the upturned end S2 serves to prevent the lever M1 and its attached lug M21 from being rocked rearwardly beyond the "taxi" position. The safety lever S is provided to prevent the pilot from inadvertently placing the master flight control lever M1 in the aftmost or "flight" position while the airplane is on the ground, or on the deck of a carrier. The spring S8 serves to retain the three-element lever S in either of its extreme positions, the normal position being that when the portion S2 extends upward to prevent the return of the lever M1 to the "flight" position. Whenever the master lever M1 is moved forward to either the "taxi" or "land" positions from the "flight" position, the forward lug M20 in passing depresses the inclined end S2 of the lever slightly but it is returned by the spring and snapped back into its normal blocking position, since the lever S is not rocked beyond its dead center.

Accordingly, in order to place the flight control lever M1 in the "flight" position from a forward position it is necessary first to rock the safety element S forward in a counter-clockwise direction thereby lowering the portion S2 such that the lugs M20 and M21 will pass thereover. After the lugs have passed over the portion S2 the safety lever will be urged into either position due to the pull of the spring S8, but will be rotated into its initial or blocking position by engagement of the pick-up lugs M20 and M21 with the remaining upturned end portion S3 which is deflected downwardly as the lug M21 moves into its rearward or "flight" position. Accordingly, it will be seen that the pick-up lugs M20 and M21 on the master lever are used to throw the safety latch S by having S2 obstruct the passage of the lugs M21 when the lever M1 is moved out of "taxi" toward "flight" position. Manual movement of S in a counter-clockwise or forward direction about its pivot S4 removes this obstruction, permitting the lever M1 to move to "flight" position. In passing, however, M21 strikes the portion S3 thereby again raising the portion S2. When the lever M is again moved forward to either the "taxi" or "land" positions on the next cycle, the lug M20 depresses the portion S2 slightly but the latter is caused to return to its obstructing or safe position due to the action of the spring S8 and the plate element S5. The purpose of the latter is to retain the handle S of the three-element lever in either of its extreme positions on either side of the dead center. The lever M1 can be returned to either of its forward positions without the necessity of operating the safety control S inasmuch as the forward lug M20 will then deflect the inclined end S2 until the lever passes the same, after which the safety handle will return to the safe position in which it will again prevent return of the control lever M1 into its "flight" position without first being manually released. The main control lever M1 is shown for illustrative purposes in Fig. 2 in a vertical position intermediate the "taxi" and "land" positions.

Referring further to Figs. 5 and 6, it will be noted that the tail wheel locking gear is affected both by rotation of the master control M1 imparting rotation to the lower cam M30 and by the rocking of the arresting gear lever A1 imparting rotation to the upper cam M27 independent of rotation of the master lever. Rotation of either cam M27 or M30 engaging the rollers G3 of the tail wheel locking lever G1 will impart fore and aft rocking movement thereto about its pivot G2. In order to unlock the tail wheel, whether the means be manual or automatic, it is necessary to apply tension to the cable G4 as shown in Figs. 1, 5 and 6. Referring more particularly to Fig. 6, when the handle G7 is moved rearward to the locked position, in which manual operation is implied, the mounting for the sheave G9, pivoted at G10, rotates about the mounting pivot G8 thereby removing tension in the cable G4. With the lever G7 locked in the "automatic" position, it is possible to tension or slacken cable G4 by means of the cams M27 and M30 operating against the rollers G3, thereby moving the lever G1 about its pivot at G2. The cam face of the element M27 has an upper and forwardly projecting portion and a lower portion of shorter radius, whereas the cam M30, which is actuated by the main lever M1, has a symmetrical cam face having a central portion of greater radius than the upper and lower receding portions. For normal "automatic" operation, the central portion of the cam M30 bears against the rollers only when the main lever M is in the "taxi" position, and the receding portions of the cam permit slackening of the cable in both the "land" and "flight" positions, thereby locking the tail wheel in these positions. The relative position of the cams M27 and M30 with respect to the lever G1 in Fig. 5, and that of the master control lever M1 in Fig. 2 correspond with each other for the particular intermediate position which has been selected for illustrative purposes only, and as the master lever would be rocked rearwardly into the "taxi" position the central portion of the cam M30 would be rocked through a similar angle such that the lever G1 would be rocked to its forward or unlocked position. When the arresting gear lever AG is moved forward to the "land" position, in conjunction with the main lever M1, the projecting portion of the cam M27 engages the roller G3, rocking the lever G1 forwardly and unlocking the tail wheel. The manual tail wheel locking assembly also includes a cable guard at G11 and a tow target connection at G12.

It should be noted that with the tail wheel "hand" or "manually" locked by rearward movement of the lever G7, both the master lever M1 and the arresting gear lever AG may be freely operated. However, with the lever G7 in the "manually locked" position, neither the main lever cam M30 nor the arresting gear lever cam M27 will unlock the tail wheel. It should also be noted in this connection that the lever G1 is continually urged rearwardly into contact with the cam faces of the elements M27 and M30 by a spring (not shown) which is actually part of the locking mechanism at the tail wheel, rather than as a part of the master flight control.

Figure 7:
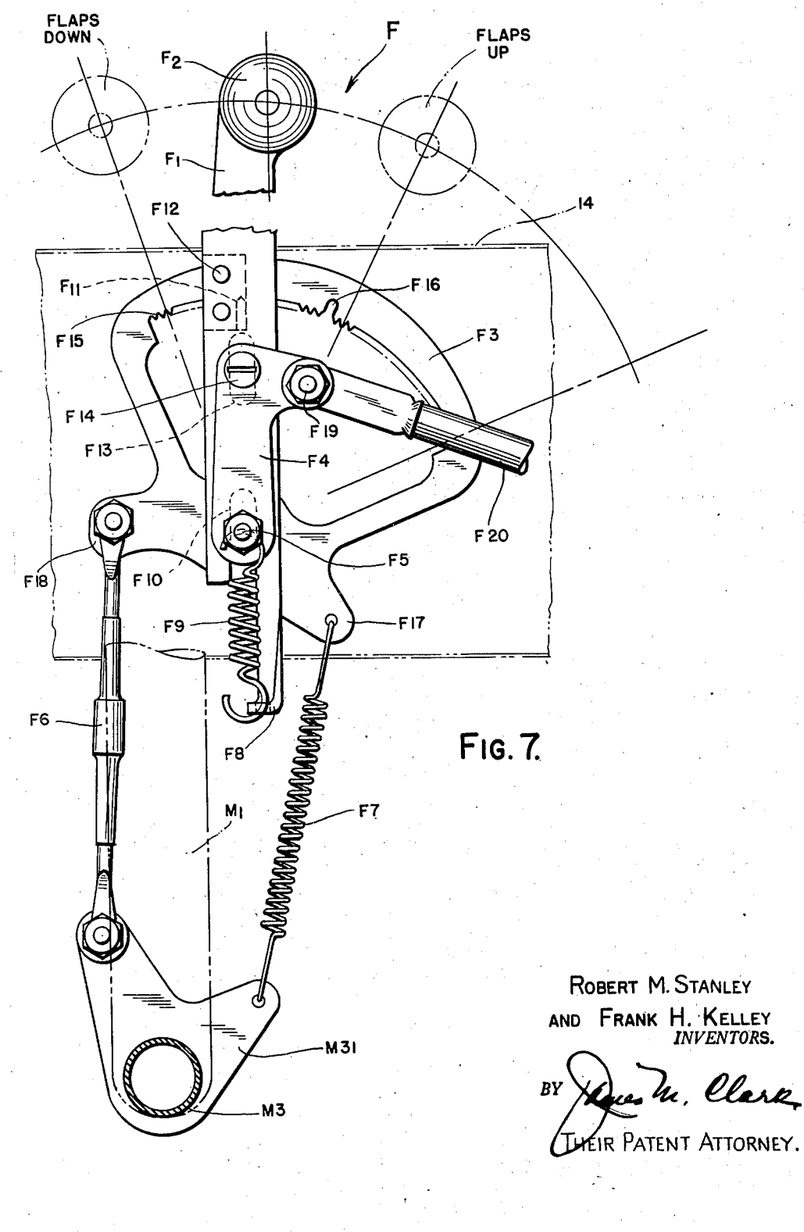
Fig. 7 is a similar view, looking from the side, of the mechanism for the actuation of the landing flaps.

Referring now to Figs. 1 and 7, there is shown the mechanism for both the master and manual control of the landing flaps of the airplane, the flap mechanism being generally indicated by the letter F. On the master control torque tube M3 there is rigidly fixed a bellcrank M31 provided with terminals at its upwardly and outwardly diverging portions. The flap control assembly F comprises a manual lever F1 having a knob F2 at its upper terminal and is pivotally movable with and with respect to the sector or quadrant F3. An offset arm element F4 is disposed with its main leg adjacent to and extending parallel with the lever F1, both being rotatable about the pivot bolt F5. The latter pivot is suitably journalled in the fuselage shelf structure 14 such that the entire flap control assembly F, including the sector F3, is rockable about the pivot F5. The sector F3 is connected to the bellcrank lever M31 by means of the adjustable turnbuckle forming a push-pull element F6 pivoted to sector portion F18 and opposed on the opposite side by the tension spring F7 connected at portion F17.

The lower portion of the lever F1 extends down beyond its pivot at F5 and has an apertured offset portion at F8 forming a terminal for the tension spring F9 which is anchored at its opposite terminal to the pivot bolt F5 tending to urge the lever F1 upwardly at all times, as permitted by the slots F10 and F13 within which the pivot bolt F5 and the attachment connection F14 between the lever and the arm F4, are permitted to slide. The function of the tension spring F9 is to maintain the pawl F11, carried upon the lever F1 by means of the rivets F12, into contact with either the teeth F15 or the main notch F16 provided in the segment F3. The arm F4 is provided with a pivot bolt F19 at its laterally offset extremity by means of which it is attached to the rod end of the push-pull tube F20, which in turn is connected to the valve mechanism for the operation of the wing flaps. This valve mechanism may be of the hydraulic or other well known type.

The mechanism of the flap control unit F shown in Fig. 7 permits manual control of the flaps to be superimposed upon the master or automatic control. It also permits the manual movement of the master lever M1 by rotating the segment F3 beyond the extreme positions of the lever F1 wherein the pawl F11 is automatically engaged with the notch F16. When the latter engagement occurs, operation of the flap valve mechanism directly by the main lever M1 is obtained. There is only one such notch F16 and it is automatically picked up by the pawl F11 as the master control is rotated between its various positions. The mere engagement of the pawl within this notch, however, is not a true indication of whether or not the flaps are in the "up" or "down" position. The true "up" or "down" flap positions are determined by the relationship of the handle F1 with respect to the index markings of the upper plate of the fuselage shelf 14, regardless of whether the handle F1 has been positioned manually, or automatically through engagement with the main lever M1, as previously described.

If for example, the master lever M1 is rotated clockwise from the position shown in Fig. 7 to the "flight" position, the quadrant F3 is merely rotated further clockwise about its pivot F5 without disturbing the central position of the lever F1. The latter is permitted to remain in the neutral vertical position by virtue of the tensioning spring F9 which allows the lever F1 and its fixedly attached pawl F11 to be depressed slightly and to slide over the teeth F15. Thus it will be noted that manual actuation of the flaps into their "down" position is blocked in the "flight" position of the main lever M1 by the pawl 11 striking the segment frame at the end of the row of teeth F15.

Figures 8, 9:
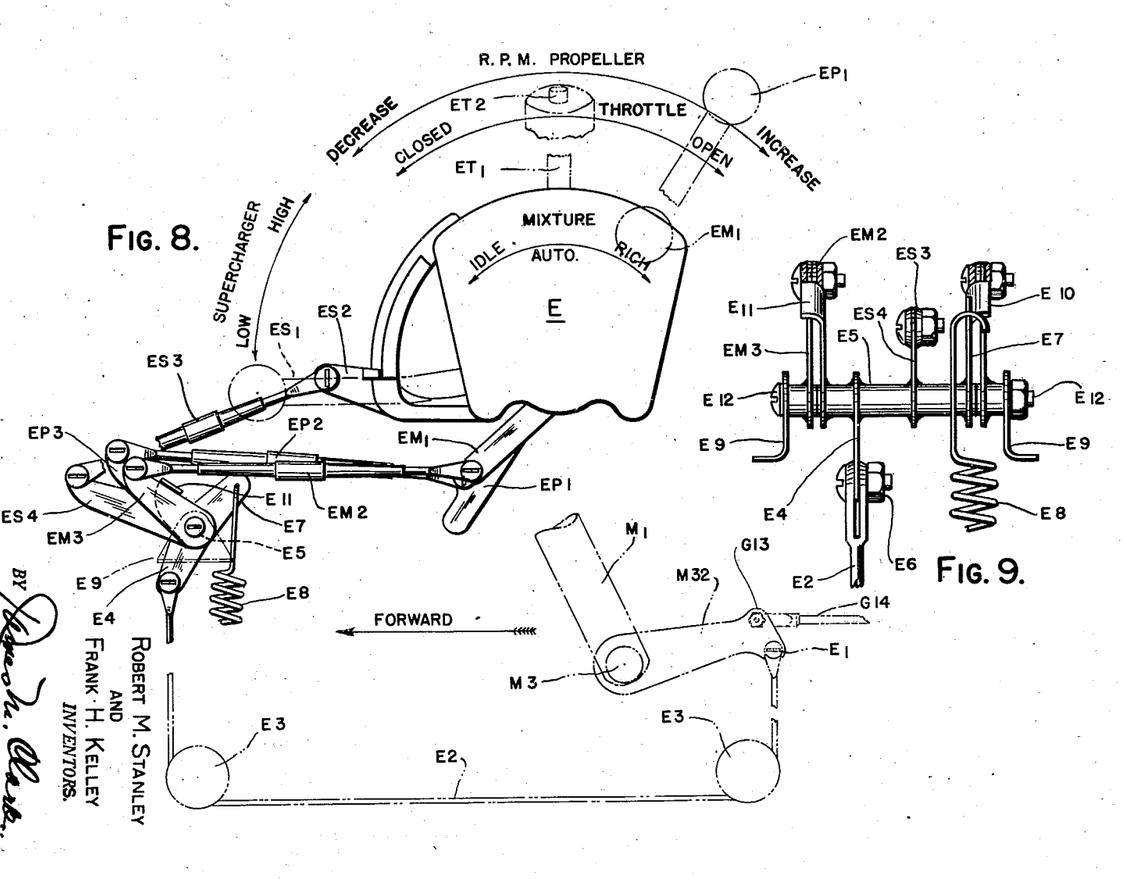
Fig. 8 is a similar side-view of the power plant control mechanism and its interconnection with the master control.
Fig. 9 is an enlarged view of the shaft assembly shown in Fig. 8, looking forward.

As shown in Figs. 1 and 8 there is also fixedly attached adjacent the end of the main torque shaft M3 a lever M32 which rotates through the same angle as the master control lever M1. The outer free extremity of the lever F32 is provided with two apertures, to the upper of which is pivotally connected at G13, the push-pull connection G14 to the landing gear actuating system. The landing wheels may be actuated by any of the well known methods which may be either hydraulically, mechanically or electrically. Such sytems are well known to the art and in themselves form no part of the present invention. It will be understood, however, that when a tensional force is applied to the rod G14 by forward rocking of the lever M1 into its landing position, the actuating mechanism is such that all three landing wheels are caused to be extended into their operative position suitable for a landing.

To the lower aperture in the lever M32 there is connected at E1 a cable E2 which is guided over the idler sheaves E3 to a connection with the engine control assembly E. This assembly is arranged such that the proper conditions of the power plant, including the engine, propeller, mixture and supercharger controls are automatically obtained by movement of the master lever M1 into any of its operative positions and that these conditions may also be manually controlled by the operator should he find it necessary at any time to do so. For purposes of manual control there is provided the throttle lever ET1, the mixture control lever EM1, the supercharger lever ES1 and the propeller setting lever EP1. The throttle control lever ET1 is also provided at its outer extremity with a switch button ET2 for the purpose of "cutting in" the throat microphone with which the pilot is usually equipped.

The engine control unit E comprises the throttle control ET1 which operates in the usual manner; the propeller control lever EP1, which extends beyond its pivot and is interconnected by the turnbuckle push-pull connection EP2 to the lever EP3 rotatably mounted on the jack shaft E12; the mixture control lever EM1 which extends below its pivot and is connected through the push-pull turnbuckle connection EM2 to the lever EM3 rotatably mounted upon the pivot shaft E12; and the supercharger speed control ES1 provided with a lever portion ES2 pivotally connected by means of the turnbuckle push-pull connection ES3 to the lever ES4 rotatably mounted upon the shaft E12.

The pivot or jack shaft E12 is supported within the brackets E9 suitably carried upon the shelf structure 14 and comprises essentially a through-bolt and nut E12 upon which a bushing (not shown) is provided, and about which the three welded lever assemblies shown in Fig. 9 are rotatable. The central lever assembly comprises the main hub E5 to which is welded or otherwise rigidly fixed the levers E4, E10, ES4 and E11. The lever E10 is a double or bellcrank lever and has an arm E7 to which a spring E8 is attached. The levers E10 and E11 are pick-up levers provided with curved outer portions which engage the levers EP3 and EM3 respectively of the end lever assemblies such that counter-clockwise rotation of the central lever assembly E5, as viewed in Fig. 8, will impart similar rotation to the end assemblies when the pick-up levers traverse the intervening angular distance. The tension spring E8, which is interconnected between the terminal E7 of the pick-up lever E10 and the structure 14 tends to rotate the central lever assembly E5 at all times in the clockwise direction, imparting tension to the cable E2 through its pivotal connection E6 at the terminal of the lever E4, which is also a rigid part of the central lever assembly E5.

As the master lever M1 is placed in the "land" notch, it positions the mixture lever EM1 in the central or "automatic rich" position of the engine control E. This is accomplished by the rotation, in a counter-clockwise direction of the lever EM3 as engaged by the pick-up lever EM11. In this position of the master lever M1, however, it is possible to manually move the knob EM1 into the "full rich" position as shown in Fig. 8 without causing the intermediate linkage EM2 to move lever EM3 further in a counter-clockwise direction away from contact with the pick-up lever E11, as shown in this figure. When the master flight control is in the "land" position the mixture lever EM1 cannot be placed in the "idle" or lean mixture position because in that case the lever EM3 is in contact with the pick-up lever E11 and rotation of the latter is restrained by the tension existing in the cable E2 by virtue of the forward position of the lever M1 and the attached lever M32 as shown in Fig. 8. A lost-motion device (not shown) in the control housing E permits automatic positioning of EM1 into the central "automatic" position or manual positioning therefrom into the full "rich" position as shown.

A substantially similar condition exists in the engine control assembly in connection with the settings of the propeller knob EP1 which is returned to its midposition by engagement of the pick-up lever E10 with the lever EP3. This arrangement is also such that with the master control M1 in the "land" position it is possible for the pilot to manually increase the propeller RPM or speed; but in this position of the master control further reduction of the propeller speed is prevented by the blocking action of the pick-up lever E10 with respect to the lever EP3. This method of operating the propeller control EP1 and the mixture control EM1 is such that when the main lever M1 is in the "taxi" position, the propeller pitch and mixture control settings may be varied manually at the will of the pilot. On the other hand, the supercharger lever ES4 is welded directly to the actuating jackshaft hub E5, since it is rarely desirable to place the supercharger in high ratio when landing, or when at low altitudes prior to landing. The supercharger control ES1 is manually permitted in the "taxi" or "flight" position at which time the cable E2 is slack, the slack being taken up by spring E8.

The operation of the master flight control is as follows: let it be assumed that the master control lever M1 is moved from its intermediate position, as indicated in Fig. 1, forwardly into the "land" position, to condition the airplane components for a ground landing. Regardless of where the individual controls may previously have been set, when the master lever M1 is moved into the "land" position, the following items are effected: (1) Counter-clockwise movement of the lever M32 operates the rod G14, actuating the valve mechanism and the three landing wheels are extended. (2) Similar counter-clockwise movement of the cam element M30 permits the rearward rocking of the lever G1, slackening of the cable G4, thereby locking the tail wheel. (3) Similar rotation of the bellcrank M31 imparts like rotation to the sector F3 which draws the flap handle F1 into the flaps "down" position. (4) The counter-clockwise movement of the lever M32 also imparts tension to the engine control cable E2, causing similar rotation of the central lever assembly E5, thereby directly moving the supercharger control ES1 into its low ratio setting. This rotation of the lever assembly E5, which also imparted to the pick-up levers E10 and E11, causes counter-clockwise movement of the levers EP3 and EM3, respectively, into the "low" pitch setting for the propeller and the "automatic" rich setting of the mixture control.

When it is desired to make a landing with the arresting gear upon the deck of a carrier, the above described steps are modified to the following extent. Assuming that the airplane is in flight, with the master control in the "flight" notch, the lever M1 is first moved from the "flight" to the "taxi" position by depressing the release button M7 at the top of the master lever and moving the latter forward; the pilot then shifts his hand to the secondary release lever M18, grasping both the flight control M1 at this point and the arresting gear lever A1. This movement of the arresting hook is facilitated by the pilot grasping both the release trigger M18 and the adjacent handle of the arresting gear lever A1 such that the latter is deflected into the space between the pick-up lugs M20 and M21 in a coupled relationship and carried with the lever M1 to the "land" position. As both levers are moved forward to the "land" position, the arresting gear is extended by slackening of the cable A4 and the airplane is prepared for a carrier landing. The arresting gear control operates only between the "taxi" and "land" positions and the arresting hook is down with the arresting gear control in the "land" position and "up" with the control in the "taxi" position. As the arresting gear lever A1 is moved forward, its attached cam portion M27 is similarly rocked downwardly (Fig. 5) engaging the roller G3, and the lever G1, thereby unlocking the tail wheel.

When the master control lever M1 and the lever A1 are returned to the "taxi" position after a landing, the arresting gear control is moved to the "up" position automatically and the arresting hook is retracted due to the tensioning of the cable A4. Release of the trigger M18 causes the lever M1 to become latched in the "taxi" position and release of the lever A1 permits it to be deflected laterally such that it clears and uncouples itself from the pick-up lugs M20 and M21. It should be noted that both the master lever M1 and the arresting gear lever A1 may be freely operated either coupled together or separately operated nothwithstanding the fact that the tail wheel may be hand locked by placement of the lever G7 into its rearmost or locked position. However, with the lever G7 of the tail wheel control in the "manual locked" position, neither the main lever cam M30 nor the arresting gear lever cam M27 will unlock the tail wheel, since the cable G4 can no longer be tensioned by forward movement of the lever G1.

The effect of the aforementioned forward movement of the master lever M1 into the "land" position upon the setting of the landing flaps is the same for both a ground or carrier landing. The forward movement of the master lever M1 imparts like movement to the bellcrank lever M31 causing counter-clockwise rotation of the sector F3 about its pivot F5 permitting the slipping of the pawl F11 over the teeth F15 until the pawl is engaged in the notch F16, whereupon the remainder of the movement of the sector F3 carries the flap lever F1 from the position shown in Fig. 7 into its forward or "flaps down" position. If less than the maximum setting of the landing flaps is desired, the pilot moves the independent wing flap control F1, aft to the desired setting; this must be done only after moving the master flight control to the "land" position. In the embodiment which has been selected for this description the maximum angle of the flaps are set at 50 degrees and they are adjustable to any angle from zero to 50 degrees. In the event that it is desired to move the master lever M1 into the "land" position and the flap control F2 is already at its forward or "flaps down" position, the latter imposes no restraint on the master lever M1. Should the manual lever F2 be at its "flaps down" master lever M1 rotates the quadrant F3 in a position no further movement will occur when the master lever M1 rotates the quadrant F3 in a counter-clockwise direction inasmuch as the pawl F11 is permitted to slip over the teeth F15. However, as the notch F16 becomes aligned with the pawl F11 it is engaged thereby and when the lever M1 is subsequently returned to either the "taxi" or "flight" positions, the lever F1 will move with it, unless it is manually over-ridden in the meantime.

While the master flight control remains in the "land" position the three affected engine controls, namely the mixture, propeller and supercharger controls, are moved into their respective "landing" positions, by the tensioning of the cable E2, and in the case of the propeller and mixture controls, blocked by the action of the pick-up levers E10 and E11, respectively. In the "land" position, as indicated on the chart in Fig. 10, the propeller control is set in the increased speed or low pitch position, the supercharger in its low ratio position and the mixture control in the automatic rich, when automatically operated and in the full rich setting by manual operation. The throttle lever ET1 as explained above is not brought under the influence of the master control in the present modification, but the invention contemplates other modifications in which it might be embodied. When the master flight control is set for "taxi" or "flight" the three engine controls can be operated manually by the pilot.

When the master flight control is moved back to the "taxi" position from the "land" position, the various controls are effected as follows, and for the following reasons; clockwise movement of the lever M32 and partial slackening of the rod G14 maintains the setting of the valve mechanism and the three landing gear wheels remain down. Clockwise rotation of the bellcrank lever M31 imparts similar rotation to the sector F3 and engagement of the pawl F11 with the latter imparts like movement of the lever F1 into its flaps "up" position. In the event the landing has been made on a carrier deck the clockwise movement of the lever A3 and tensioning of the cable A4 results in retraction of the arresting gear. On the other hand, in the event a ground landing were made, the clockwise rotation of the cam element M30 engaging the roller G3 moves the lever G1 and its attached cable G4 forwardly into the "unlocked" condition of the tail wheel. The clockwise movement of the lever M32 permits slackening of the engine control cable E2 permitting the tension spring E8 to rotate the central lever assembly E5 in a clockwise direction causing the supercharger control setting to be moved into high ratio and permitting this and the other engine controls to be moved manually if desired.

When the master flight control is moved from the "flight" position to the "taxi" position the landing gear, and the tail wheel, are extended but none of the other controls are affected. The engine controls are unaffected because the pick-up levers are not moved sufficiently to engage either of the levers EM3, EP3 or ES4. The position of the flap lever F1 is not affected by the corresponding movement of the bellcrank M31 due to the slipping of the pawl over the teeth of the sector F3, unless the lever M1 were not initially in the full "flaps up" position. With the lever F1 in the "flaps up" position counter-clockwise rotation of the sector F3 corresponding with movement of the master lever M1 from the "flight" to the "taxi" position would merely bring the end of the row of teeth on the sector adjacent the pawl without imparting similar rotation to the lever F1.

In moving the master lever M1 from the "taxi" to the "flight" positions the following components are affected: As mentioned above, before the master lever can be moved rearwardly into the "flight" position it is necessary that the pilot move the safety lever S forward, or to the left as viewed in Fig. 2. As indicated previously, this safety lever S is provided to prevent the pilot from inadvertently placing the master flight control in the "flight" position thereby retracting the landing gear while the airplane is on the ground. Accordingly, the master lever M1 should only be moved into the "flight" position after the airplane has taken off from the ground or from the deck of a carrier. The clockwise movement of the lever M1, coupled with the lever A1 adjacent the release M18, imparts similar movement to the arresting gear lever arm A3 moving the cable A4 forwardly and retracting the arresting gear, if the same had been extended. Similar rotation of the lever M32 actuates the push-pull rod G14 and causes retraction of the main landing wheels. Clockwise rotation of the cam element M30 permits the lever G1 to follow the cam face rearwardly and to cause the tail wheel to be locked. The clockwise rotation of the bellcrank M31 imparts similar clockwise rotation to the segment F3, the slot F16 of which is now in positive engagement with the pawl F11, and the lever F1 is rotated rearwardly about its pivot F5 into the "flaps up" position.

The pilot can of course adjust the setting of the flaps at will by pressing downwardly on the lever F1, thereby disengaging the pawl F11 from the slot F16, and setting the lever at any desired flap position at which the pawl will again engage the teeth F15. Due to the clockwise rotation imparted to the torque tube assembly M3, the concurrent rotation of the lever M32 permits slackening of the engine control cable E2 whereupon the central lever assembly E5 is permitted to rotate in a clockwise direction under the influence of the tension spring E8. This movement of the lever assembly brings the supercharger control handle into its high ratio position and clears the pick-up levers E10 and E11 from the respective propeller and mixture control levers such that the latter are subject entirely to manual control over their full ranges of adjustment.

In the foregoing description wherever the retractable landing gear has been referred to it should be understood that this term includes the two main landing wheels G15, and the tail wheel G16; and that the landing gear control rod G14 serves through suitable hydraulic or other mechanisms G18 and G1 to extend or retract these three ground engaging elements either simultaneously, or in substantially the same operation. The invention is, however, equally applicable to systems having retractable main landing gear with a non-retractable tail wheel. The tail wheel which has been included in the present embodiment is preferably of a castoring or swivable type, and the tail wheel lock G17 referred to includes the means for preventing or limiting swiveling or casting of the tail wheel under certain operations. The tail wheel G16 indicated in Fig. 11 may be self-centered by means of a suitable device enclosed in the tail wheel castering housing. This centering device may be a unit separate and apart from the master flight control and may serve to center the tail wheel G16 as soon as the weight of the airplane is removed from the tail wheel, regardless of whether the lock G17 is applied or not. A pin associated with the tail wheel lock G17 is preferably spring-loaded in such manner that the lock may be applied on the ground with the wheel uncentered, the pin subsequently entering the locking hole, under the force of the spring, when the wheel becomes centered. The present invention is, however, equally applicable to landing gear systems of the tricycle type in which the third wheel as described would be known as the nose wheel. The present invention is also adapted to amphibian and water type landing systems, and to the control of other land or water engaging elements retractably associated with aircraft such as skis, skids, floats, pontoons or other well known equivalent aircraft components.

While a particular constructional arrangement of a master control mechanism for selectively usable control instrumentalities has been described and illustrated for the purpose of disclosing the present invention, it is to be understood that this invention is not to be limited to the particular construction which as been disclosed but that various changes in the size, shape, general arrangement and details of its parts may be resorted to; and further, that either a hydraulic or electrically operated mechanism could be utilized to accomplish the functions of the mechanically operated mechanism which has been disclosed without in any way exceeding the scope of the present invention. Other modifications and advantages of the present invention, both with respect to general arrangement and detailed features, which may become apparent to those skilled in the art after a reading of the foregoing specification are each intended to be embraced within the scope and spirit of this invention as more particularly defined in the appended claims.

We claim:

1. In an airplane having a landing system comprising a retractable landing gear including a lockable tail wheel and a retractable arresting gear, a master control lever operatively connected with said landing gear and tail wheel lock adapted by movement in one direction to extend said landing gear and lock said tail wheel, and control means operatively connected with said arresting gear adapted upon concurrent movement with said master control in said direction to extend said arresting gear concurrently with said landing gear while preventing the locking of said tail wheel.

2. In an airplane provided with a power plant, landing flaps associated with the wings of said airplane, and a retractable landing gear; an individual manual control for said power plant, a master manual control adapted by its positioning to automatically condition said airplane for landings and take-offs, said master control being operatively connected with said power plant, wing flaps and retractable landing gear including means whereby adjustment of said master control into said landing position extends said flaps and landing gear and imposes restrictions upon the control of said power plant, and including means whereby adjustment into said take-off position retracts said flaps, maintains said landing gear extended and places said power plant under said individual manual control.

3. In an airplane provided with a retractable tail wheel and a retractable arresting gear, a lock associated with said tail wheel permitting swivelling when unlocked, a manual lever adapted for the extension and retraction of said tail wheel in a locked condition, a second lever adapted for concurrent movement with said first lever to extend said arresting gear and concurrently unlock said tail wheel in the direction in which said first lever initiates extension for said tail wheel.

4. In an aircraft having a castoring tail wheel and an arresting gear, said tail wheel provided with a spring-pressed lock to prevent castoring, tensioning means adapted to overcome said spring for the unlocking of said tail wheel, a control lever operatively connected with said arresting gear adapted for its retraction and extension, a cam element rotatably connected with said arresting gear control engageable with said tensioning means to unlock said tail wheel in the extended position of said arresting gear and a control lever operatively connected to a second cam element engageable with said tensioning means adapted to over-ride the unlocking of said tail wheel in the retracted position of said arresting gear and the extended condition of the tail wheel.

5. In an aircraft having a castoring tail wheel and an arresting gear, said tail wheel provided with a spring-pressed lock to prevent castoring, tensioning means adapted to overcome said spring for the unlocking of said tail wheel, a control lever operatively connected with said arresting gear adapted for its retraction and extension, a cam element rotatably connected with said arresting gear control engageable with said tensioning means to unlock said tail wheel in the extended position of said arresting gear, a control lever operatively connected to a second cam element engageable with said tensioning means adapted to over-ride the unlocking of said tail wheel in the retracted position of said arresting gear and the extended condition of the tail wheel and a two-position manual control adapted to selectively superimpose either automatic or locking action upon said tensioning means.

6. In an airplane provided with a power plant, a retractable arresting gear and movable wing flaps, a single manually actuatable control means operatively connected to simultaneously condition said power plant, arresting gear, and wing flaps for given landing and take-off operations of said airplane, and individual manual control means for separately adjusting the said power plant, arresting gear and wing flaps by over-riding said first control means.

7. In an airplane having a power plant, a retractable landing gear including a lockable tail wheel, and landing flaps associated with the wings of said airplane, individual manual controls for said power plant, tail wheel lock, and wing flaps, and a master control operatively connected with said power plant, tail wheel lock, and flap controls adapted to superimpose adjustment of these components corresponding to flight conditions into which said master control is positioned.

8. In an airplane provided with landing flaps, a master control lever adapted to position said flaps simultaneously with the positioning of a plurality of aircraft components for the landing and flight conditions of said airplane, a quadrant rotatable by said master control lever, detents on said quadrant, a manual lever pivoted to rotate with and with respect to said quadrant, said manual lever operatively connected to said flaps and having a pawl engageable with said quadrant detents whereby movement of said master lever into said landing position causes direct engagement of said quadrant with said manual lever through engagement of said pawl with one of said detents for the extension of said flap, and movement of said master lever into its flight position causes retraction of said flaps and blocking of said flap actuating manual lever by engagement of its pawl with another of said quadrant detents.

9. In an airplane having a landing system comprising a retractable landing gear including a lockable tail wheel and a retractable arresting gear, a master control lever operatively connected with said landing gear and said tail wheel lock adapted by movement in one direction to simultaneously extend said landing gear and lock and tail wheel, and a control lever operatively connected with said arresting gear adapted upon concurrent movement with said master control lever in said same direction to extend said arresting gear concurrently with said landing gear while preventing the locking of said tail wheel, both said levers being adjacently disposed whereby they may be jointly operated by the single hand of an operator for the simultaneous extension of both said landing and arresting gears.

10. In an airplane having a landing system comprising a retractable landing gear including a lockable tail wheel, a retractable arresting gear and landing flaps, a master control lever operatively connected with said landing gear, tail wheel lock and landing flaps adapted by its sole movement in one direction to extend said landing gear and landing flaps and to lock said tail wheel, and control means operatively connected with said arresting gear adapted upon joint and concurrent movement with said master control in said same direction to extend said arresting gear concurrently with said landing gear and landing flaps while preventing the locking of said tail wheel.

11. In a landing system for an airplane having a power plant, a retractable landing gear including a lockable tail wheel and landing flaps associated with the wings of said airplane, separate individual manual controls for said power plant, said tail wheel lock, and said wing flaps, and a master control lever operatively connected with said power plant, landing gear, tail wheel lock and wing flap controls adapted to be moved into positions corresponding to landing and take-off conditions of said airplane and to superimpose adjustments of said power plant, landing gear, tail wheel lock and landing flaps corresponding to each of the said positions of said master control and said operating conditions of said airplane.

12. In a landing system for an airplane having a power plant, a retractable landing gear including a lockable tail wheel, and wing flaps, an individual manual control for adjustment of said power plant, tail wheel lock and wing flaps, and a three-position master control lever operatively connected with said power plant, landing gear, tail wheel lock and wing flaps movable into positions corresponding to the landing, take-off and flight conditions of said airplane, said master control lever adapted when moved into any of said three positions to superimpose adjustment of said power plant, tail wheel lock and wing flaps over the adjustment previously made by said respective individual manual controls.

FRANK H. KELLEY.
ROBERT M. STANLEY.

REFERENCES CITED

The following references are of record in the file of this patent:

UNITED STATES PATENTS

| Number | Name | Date |
|---|---|---|
| 2,071,063 | De Florez et al. | Feb. 16, 1937 |
| 2,272,664 | Gropler | Feb. 10, 1942 |
| 2,293,198 | Filmer | Aug. 18, 1942 |
| 2,279,074 | Stearman | Apr. 7, 1942 |
| 2,242,125 | Hineman | May 13, 1941 |
| 2,034,083 | Butler | Mar. 17, 1936 |
| 1,894,418 | Pitcairn | Jan. 17, 1933 |
| 2,366,868 | Noonan et al. | Jan. 9, 1945 |

FOREIGN PATENTS

| Number | Country | Date |
|---|---|---|
| 516,720 | British | Jan. 10, 1940 |